United States Patent [19]
Bergman

[11] Patent Number: 5,906,462
[45] Date of Patent: May 25, 1999

[54] USE OF A BLIND RIVET TO RETAIN A MECHANICAL FRAME INTO A PLASTIC BASE

[75] Inventor: Robert G. Bergman, Lawrenceville, Ga.

[73] Assignee: Siemens Energy & Automation, Inc., Alpharetta, Ga.

[21] Appl. No.: 08/988,415

[22] Filed: Dec. 10, 1997

[51] Int. Cl.⁶ ............... F16B 13/04; F16B 19/08; B25G 3/28
[52] U.S. Cl. ............... 411/43; 411/104; 411/501; 403/256; 403/281; 403/282
[58] Field of Search .................. 411/43, 69, 70, 411/104, 500, 501, 542; 403/242, 256, 274, 278, 281, 282

[56] References Cited

U.S. PATENT DOCUMENTS

| | | |
|---|---|---|
| 2,921,320 | 1/1960 | Lantz ................................. 411/104 X |
| 4,003,107 | 1/1977 | Klein et al. . |
| 4,245,652 | 1/1981 | Kelly et al. .......................... 411/542 X |
| 4,580,936 | 4/1986 | Francis et al. . |
| 4,603,312 | 7/1986 | Conner . |
| 4,647,264 | 3/1987 | Pamer et al. ........................... 411/43 X |
| 4,749,829 | 6/1988 | Ikeda et al. . |
| 4,835,501 | 5/1989 | Havonic . |
| 4,859,108 | 8/1989 | Maddox ............................... 403/282 X |
| 4,882,456 | 11/1989 | Hovanic et al. . |

Primary Examiner—Neill Wilson

[57] ABSTRACT

An apparatus for securing a mechanical frame to the base of a circuit breaker. The mechanical frame includes a U-shaped tab defined by first and second legs extending from the bottom of the frame. Each leg has an interior edge and an exterior edge. The interior edges of the legs are separated from one another by a predetermined distance, and at least one of the legs includes a lateral groove across its interior edge. The base includes a generally rectangular slot into which the tab is inserted. At the center of the slot is a cylindrical void extending through the circuit breaker base. A blind rivet having a head portion and a body portion, is inserted into the cylindrical void from the outside of the base such that the body portion of the rivet is between the legs of the tab. The blind rivet is then mechanically upset causing the body portion of the rivet to expand into the lateral groove in the tab and to pull the object securely toward the base. One leg of the U-shaped tab has a tang extending from its exterior edge. When the legs are spread by the force of the expanding rivet, the tang bites into the plastic base and further helps to hold the mechanical frame securely in the base.

5 Claims, 6 Drawing Sheets

5,906,462

USE OF A BLIND RIVET TO RETAIN A MECHANICAL FRAME INTO A PLASTIC BASE

FIELD OF THE INVENTION

The present invention relates to fasteners, generally and in particular to the use of a deformable fastener to attach a metal frame to a plastic base.

The subject invention is embodied in a method of attaching the mechanical frame of a circuit breaker to a base portion of a circuit breaker housing. While the invention is described in terms of the circuit breaker mechanical frame, it is contemplated that it may be practiced in any of a number of applications in which a first member having a flat tab which is perpendicular to a second member is joined by the tab to the second member.

Previous methods of attaching mechanical frames into a circuit breaker base, have employed a screw which is inserted through the plastic base and into a slot in the tab which is an integral part of the metal frame. Because the screw thread only partially engages the sides of the slot in the flat tab, it is relatively easy to overtighten the screw, stripping the threads on the sides of the slot. When the screw is a self-tapping screw and the tab is formed from a soft metal, the threads formed in the tab by the screw may be relatively easily stripped. Once these threads have been stripped, the frame is no longer held securely in the base and may need to be removed and reworked. In addition, because the screw is inserted into the slot from the base, the insertion forces tend to push the frame upwards and away from the plastic base as the screw is installed. If, because of this upward motion, the tab becomes caught in the frame, tightening the screw may not seat the frame properly into the base.

Furthermore, the holding power of the screw into the cross-section of the mechanical frame may not be sufficient to adequately secure the mechanical frame to the plastic base and may permit torsion of the mechanical frame or other forms of movement which may affect the operation of the breaker.

SUMMARY OF THE INVENTION

The present invention is embodied in apparatus and a method for attaching a first and second members where the first member is relatively flat and perpendicular to the second member. In accordance with the invention, the first member includes an opening into which a deformable fastener is inserted after first passing through the second member. The fastener retains the first member to the second member by expanding into the opening in the first member as the deformable fastener is mechanically upset.

According to one aspect of the invention, the opening in the first member includes a lateral groove which provides a volume into which the deformable fastener may flow as the fastener is mechanically upset. The fastener retains the first member to the second member by deformation into and around the groove, exerting a force which tends to pull the first member toward the second member.

According to another aspect of the invention, the opening in the first member defines a U-shaped tab having first and second legs and the opening in the second member defines a slot into which the U-shaped tab is inserted. At least one leg of the U shaped tab includes a tang which is pressed into the side of the slot in the second member as the legs are pushed apart by a force exerted on the legs by the fastener as the fastener is upset.

DETAILED DESCRIPTION

Figure 1:
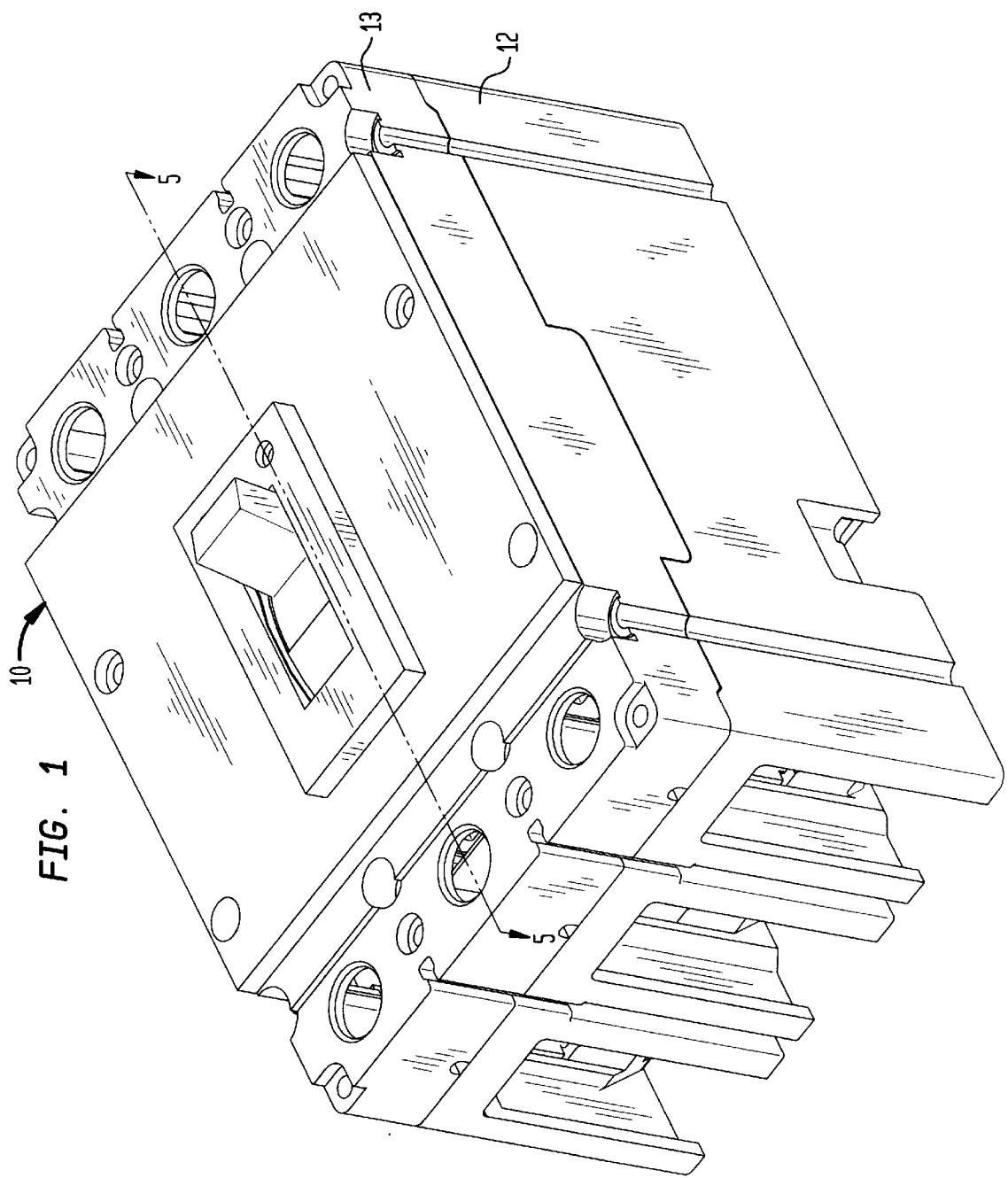
FIG. 1 is an isometric view of a circuit breaker which includes an embodiment of the present invention.

The present invention provides substantial advantages in that it simultaneously brings the mechanical frame into firm contact with the plastic base, prevents the separation of frame from the base and, by expanding in the U-shaped slot after insertion, provides necessary force from the blind rivet to hold the frame securely to the base.

A blind rivet, also known as a pull-rivet, is a rivet which may be used to attach two workpieces by setting the rivet into an opening through both workpieces but without access to the remote or blind side of the workpieces. An exemplary blind rivet is disclosed in U.S. Pat. No. 4,580,936 entitled "BLIND RIVET ASSEMBLY" which is incorporated by reference herein for its teachings on blind rivets.

Briefly, the blind rivet includes a tubular shell and a stem or mandrel. The tubular shell has a head and an elongate shank. The shank includes a weakened portion, such that, when the stem or mandrel is pulled, the weakened portion of the shank collapses forming a blind head on the far side of the two members that are being joined. The blind rivet is used as follows. The shank is inserted into aligned apertures in the two members which are to be joined until the head of the shell rests against the opening in the near member. The stem or mandrel is then pulled, causing the weakened portion of the shank to collapse and expand annularly to form a blind head beyond the aperture in the far member. As the stem is pulled, the weakened portion of the shell deforms and expands further, pressing against the blind side of the far member to pull the far member and the near member together. In a typical blind rivet, the stem or mandrel breaks once the applied force exceeds a threshold value with the remaining portion of the stem or mandrel forming a plug in the portion of the shank which extends through the two members.

In the exemplary embodiment of the invention, the blind rivet is not used to join two flat members having aligned apertures but is used to attach a perpendicular member to a horizontal member. In this embodiment, the blind rivet is inserted through an opening in the flat member into a U-shaped opening in the perpendicular member. The blind rivet is typically set using a rivet setting tool (not shown). When the tool is activated, it rejects the blind rivet through the aperture in the horizontal member and into the U-shaped opening in the perpendicular member. It then pulls the mandrel back through the rivet thereby collapsing the rivet and making the material in the weakened shank flow into the U-shaped opening. This causes a downward pressure which pulls the perpendicular member toward the horizontal member. The mandrel then breaks away from the rivet and remains in a holder of the gun.

In the description which follows like parts are marked throughout the specification and drawing with the same reference numerals, respectively. The drawing figures are not necessarily to scale and certain features of the invention may be shown exaggerated in scale in the interest of clarity. In the exemplary embodiment of the invention described below, a blind rivet is used in a circuit breaker to attach a mechanical frame to an insulating plastic base.

Figure 2:
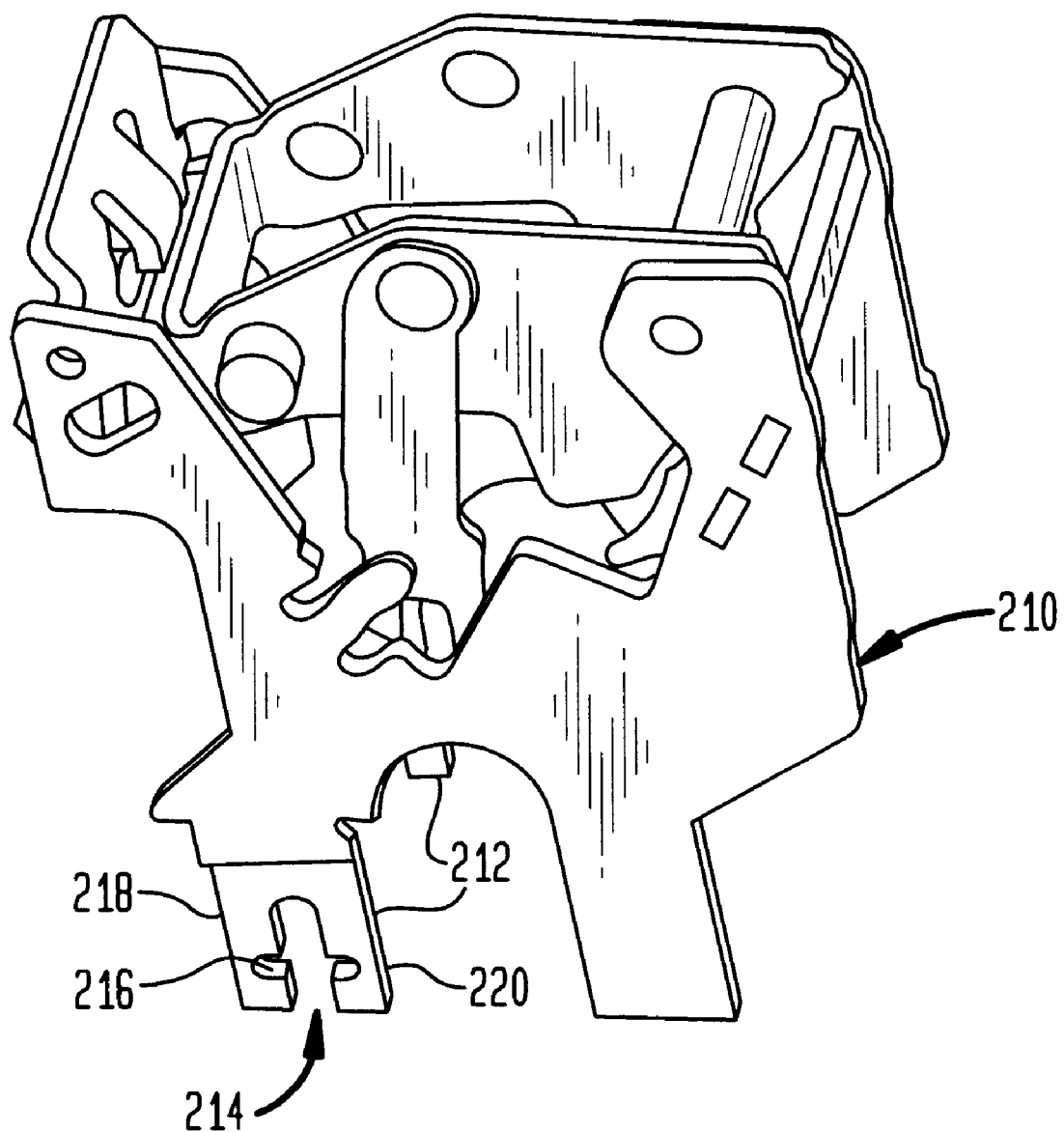
FIG. 2 is an isometric view of a mechanical frame including a mounting tab according to the present invention.

Referring to FIG. 1 an exemplary circuit breaker 10 according to the present invention includes an insulating support base 12, and cover 13. The mechanical frame is shown in FIG. 2. Typically the mechanical frame of a breaker includes the operating mechanism which is used to close the breaker contacts and a trip latch which, when activated, quickly opens the breaker contacts. In the exemplary embodiment of the invention, the mechanical frame 210 includes a mounting tab 212 having a U-shaped opening 214 into which the blind rivet (shown in FIG. 5) is inserted to attach the mechanical frame 210 to the circuit breaker base 12. The opening 214 is formed by two legs 218 and 220, each of which includes a lateral groove 216. As described in detail below, when the blind rivet is upset, its deformable portion expands into the lateral grooves 216 to grasp the mechanical frame 210 and exert a downward pressure on the frame causing it to be pulled into the base 12.

Figure 3:
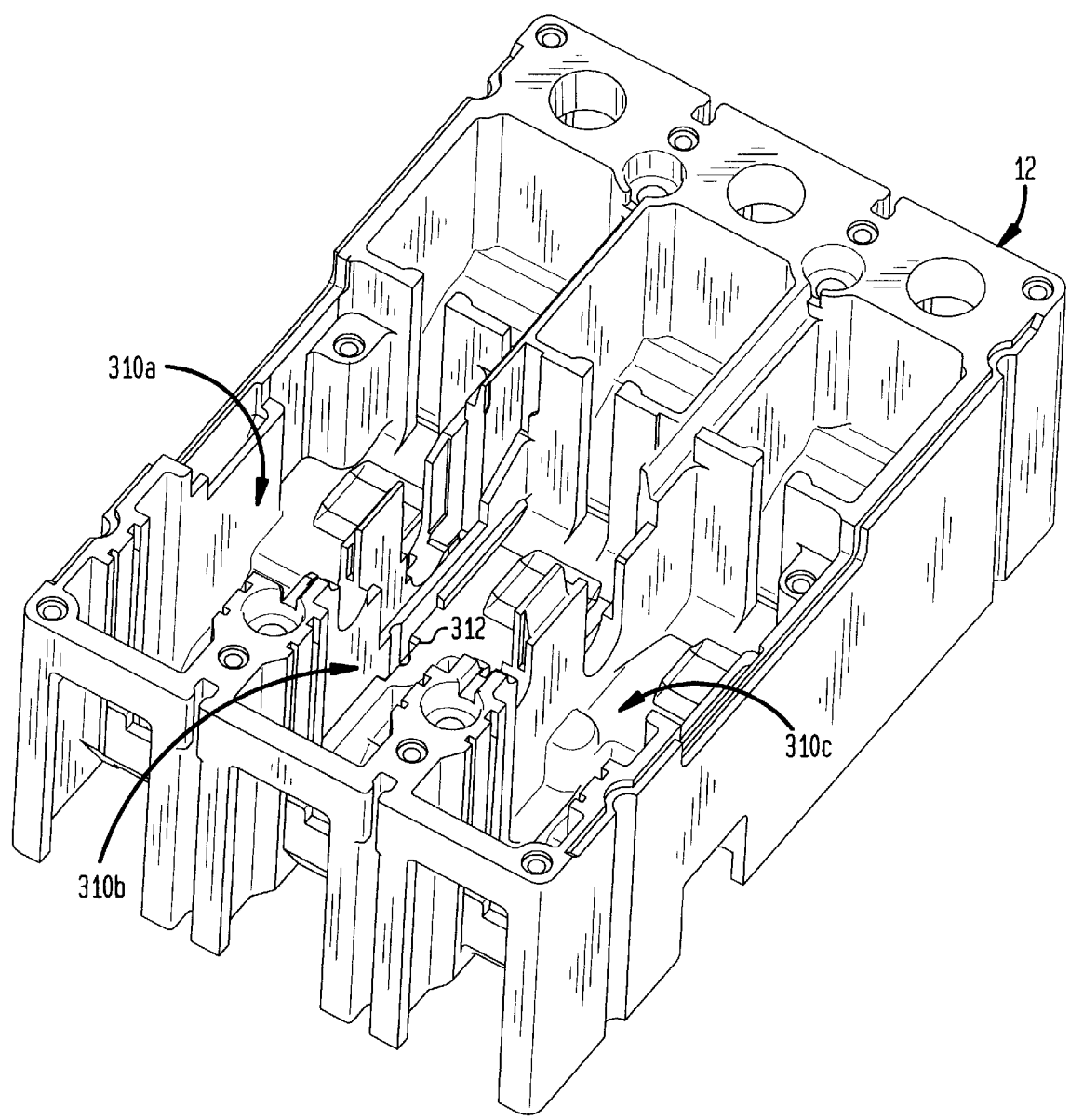
FIG. 3 is an isometric view of the base of the circuit breaker shown in FIG. 1 with the cover removed.

FIG. 3 is an isometric drawing of the base 12 with the cover 13 removed. As shown in FIG. 3, the base 12 includes three chambers 310a, 310b and 310c. The mechanical frame 210 is inserted only into the center chamber 310b. The exemplary mechanical frame 210 is attached to the base 12 using two blind rivets. The tabs 212 of the mechanical frame (shown in FIG. 2) are inserted into slots 312 (only one of which is shown in FIG. 3). The blind rivet is inserted from the bottom side of the base 12 and upset to secure the tabs 212 into the slots 312.

Figure 4:
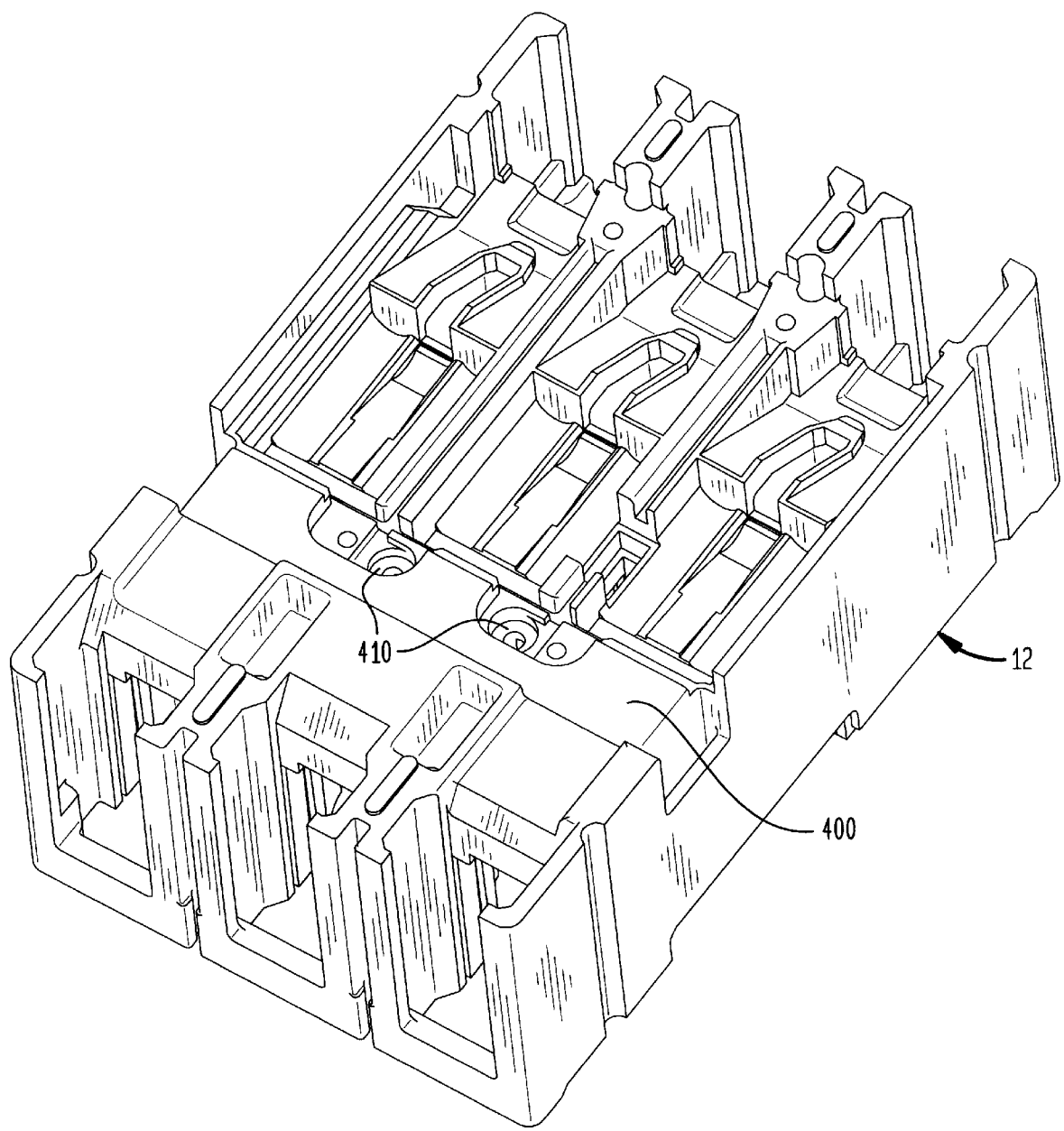
FIG. 4 is an isometric view of the bottom side of the base of the circuit breaker shown in FIG. 1.

FIG. 4 is an isometric drawing showing the bottom of the base 12. The base includes two counterbore holes 410 into which the blind rivets are inserted in order to fasten the mechanical frame 210 to the base 12.

Figure 5:
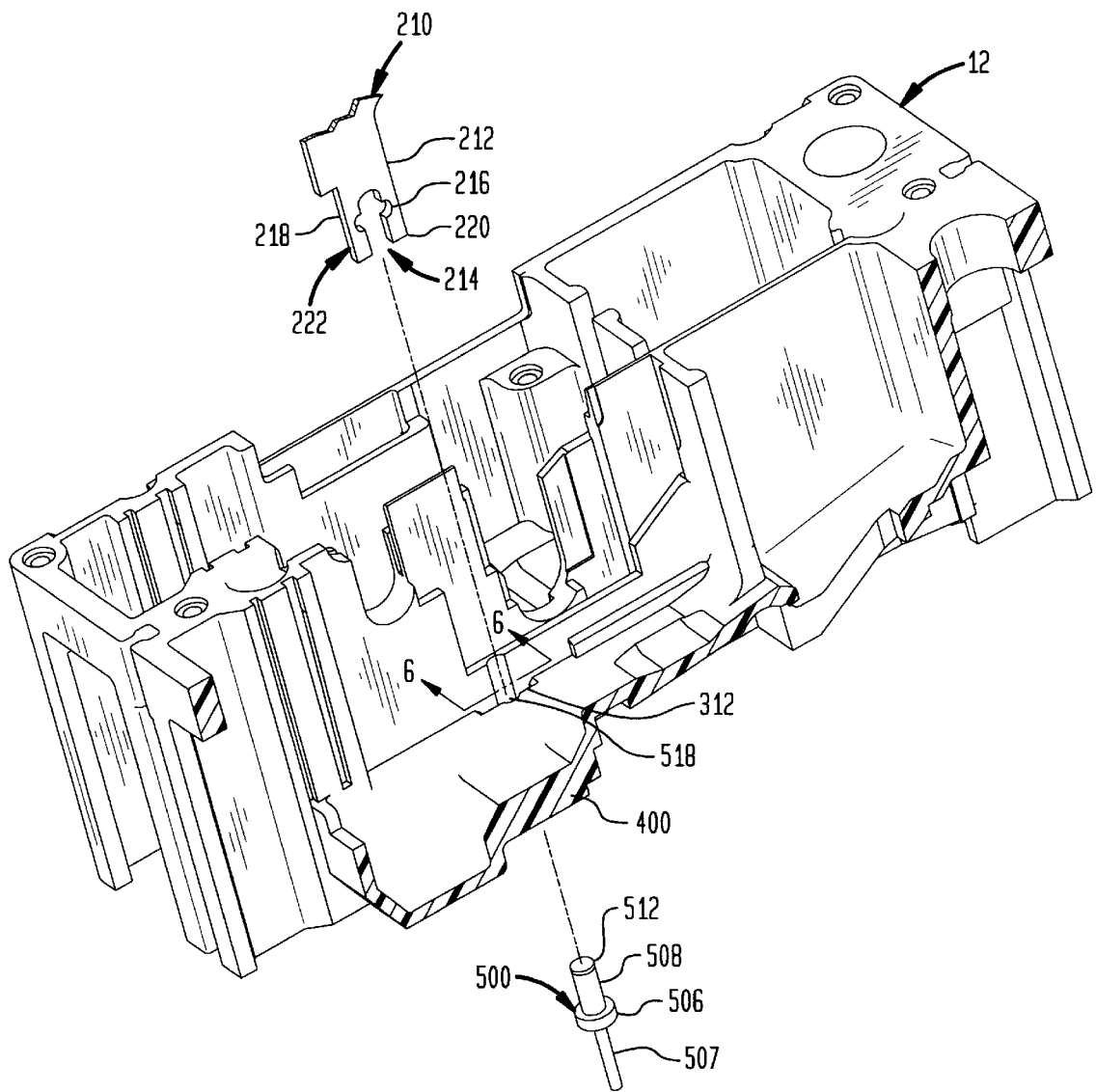
FIG. 5 is an exploded isometric view the circuit breaker shown in FIG. 1, cutaway on the line 5—5, which is useful for describing how the mechanical frame is attached to the circuit breaker base by the blind rivet.

FIG. 5 is an exploded isometric drawing of the blind rivet 500, base 12 and mechanical frame tab 212 cutaway along the line 5—5 shown in FIG. 1, which illustrates the manner in which the mechanical frame 210 is secured to the base 12. FIG. 5 shows the initial insertion of tab 212 into the slot 312 of the base 12.

The blind rivet 500 includes a tubular shell having a head 506, a shank 508 and a mandrel 507. The head, shank and mandrel are generally cylindrical in shape. The diameter of the mandrel is less than the diameter of the shank which is less than the diameter of the head. The mandrel is fixedly attached to a plug 512 which closes off the top of the shank 508. When the mandrel is pulled, it exerts a force, through the plug 512, on the shank 508, causing at least a portion of the shank to deform.

The shank 508 of the blind rivet 500 is inserted into a cylindrical opening 518 in the slot 310 which extends through the bottom wall 400 of the circuit breaker base 12. The head is sized to fit within the counterbore hole 410 (shown in FIG. 4) but not within the cylindrical opening 518. The tab 212 of the mechanical frame 210 fits into the slot 310 such that the legs 218 and 220 of the tab are on either side of the shank 508. When the blind rivet is upset by pulling the mandrel, the shank 508 deforms and expands into the opening 214 in the tab 212 and into the lateral grooves 216 on the legs 218 and 220. As the blind rivet is upset, the deforming shank is moving toward the bottom wall 400 of the base 12. As the deforming shank expands and makes contact with the tab 212, it pulls the tab deeper into the slot 312 to securely fasten the mechanical frame 210 to the base 12.

As described above, each tab 212 of the mechanical frame 210 includes two legs, 218 and 220 which define a U-shaped opening. The interior edges of each leg are separated from one another by a distance which is wider than the shank 508 of the blind rivet 500 and one of the legs may include a lateral groove 216 on its inside edge. In the exemplary embodiment, one leg (218) has a tang 222 extending from the outer edge of the leg, at the base of the tab. When the legs of the tab are spread by the force of the upset rivet 500, the spur 222 bites into the side of the slot 312 in the bottom wall 400 of the plastic base 12 to further hold the mechanical frame securely in place.

Figure 6A:
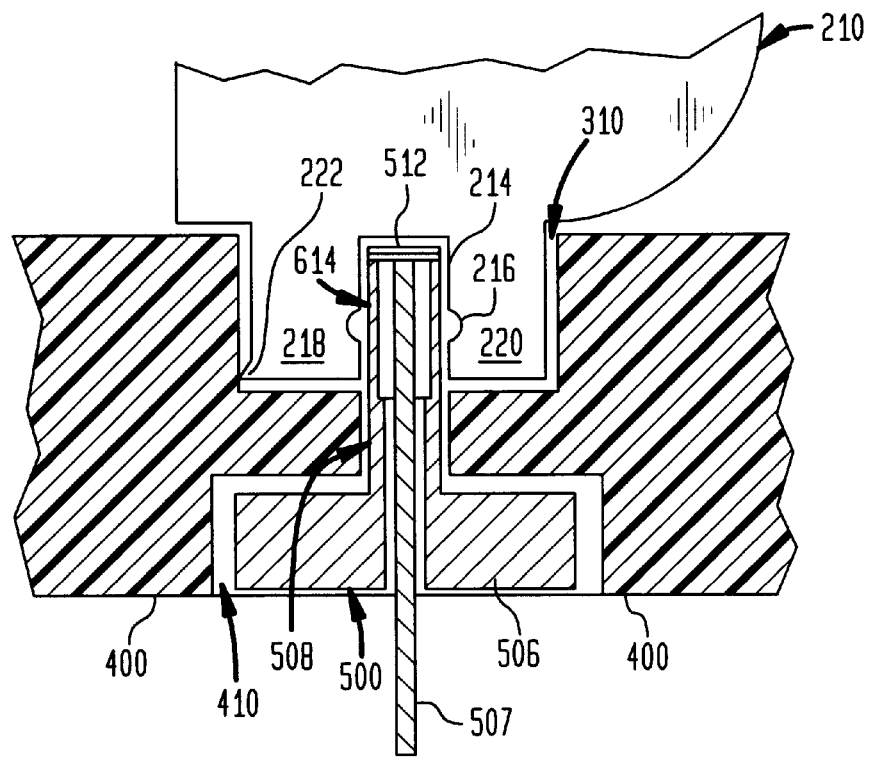
FIGS. 6A and 6B are cross-sectional views of breaker base shown in FIG. 5, along the lines 6—6.
Figure 6B:
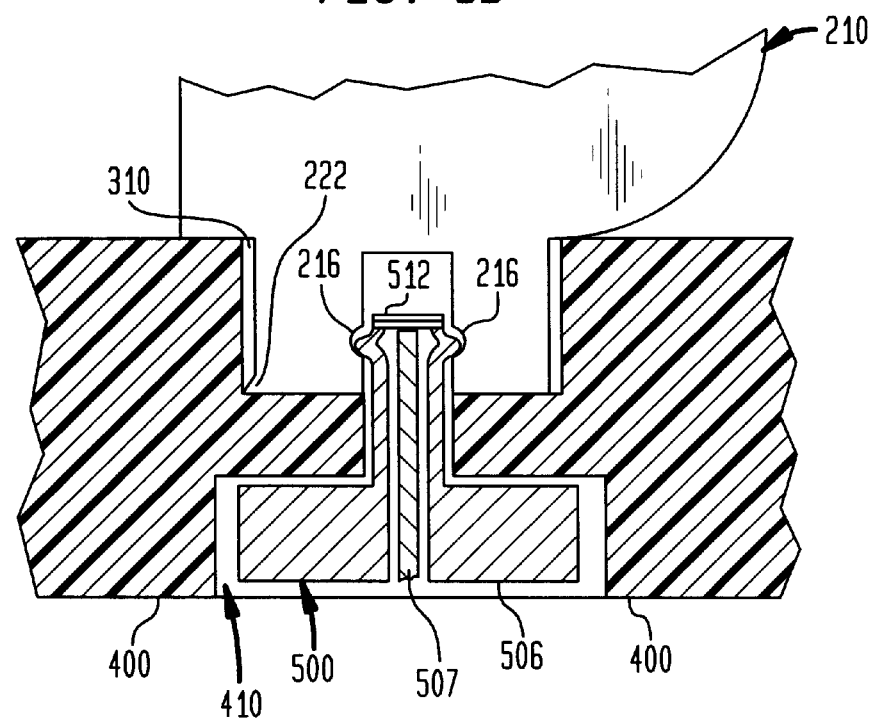

FIGS. 6A and 6B are cut away drawings on the line 6—6 shown in FIG. 5. FIG. 6A shows the combination of the mechanical frame 210, base 12 and blind rivet 500 when the blind rivet is first inserted into the opening 518 and FIG. 6B shows the same combination after the blind rivet is upset.

FIG. 6A shows the head 506 of the blind rivet 500 inserted into the counterbore 410 on the underside of the bottom wall 400 of the breaker base 12 such that the shank portion of the rivet 500 extends through the opening 518 and into the slot 312 between the legs 218 and 220 of the mounting tab 212.

As shown in FIG. 6A, the shank portion 508 of the blind rivet 500 includes a weakened section 614. When the mandrel 507 pulls the plug 512 toward the head 506, the weakened section 614 bends out, away from the mandrel, filling the space between the legs 218 and 220 of the mounting tab and filling lateral grooves 216 in the legs, as shown in FIG. 6B. As is also shown in FIG. 6B, the expanding shank pushes the legs 218 and 220 apart, forcing the tang 222 into the side of the slot 312. In addition, as the shank is deformed, it pulls the mounting tab 120 into the slot 312 and, at the same time, pulls the head 506 of the blind rivet further into the counterbore 410. When fully upset, the blind rivet 500 holds the mounting tab 212 of the mechanical frame 220 tightly against the bottom of the slot 312. This ensures that the mechanical frame 210 is held in the proper position in the base 12 of the circuit breaker 10.

While the invention has been described in terms of an exemplary embodiment, it is contemplated that it may be practiced as outlined above within the scope of the following claims.

What is claimed:

1. Apparatus for securing an object to a base comprising:
   a flat, generally rectangular tab mechanically attached to the object, the tab having first and second legs extending from the object which first and second legs define a generally U-shaped opening in the tab, each leg having an interior edge and an exterior edge, the interior edges of the legs being separated from one another by a predetermined distance and one interior edge having a lateral groove; and
   a blind rivet having a head portion and a body portion, the head portion being generally circular in shape and having a diameter greater than the predetermined distance, the body portion being generally cylindrical in shape and having a diameter less than the predetermined distance;
   wherein the base includes a generally circular opening having a diameter approximately equal to the predetermined distance, whereby, when the blind rivet is inserted through the opening in the base and into the U-shaped opening in the tab and is mechanically upset, the body portion of the blind rivet expands into the lateral groove in the tab and pulls the object toward the base.

2. Apparatus according to claim 1, wherein when the blind rivet is mechanically upset the blind rivet exerts a pulling force on the lateral groove of the tab to pull the tab toward the base.

3. Apparatus according to claim 2, wherein:

the base further includes a slot into which the tab is inserted, wherein the circular opening in the base is aligned with the slot so as to be between the legs of the tab when the tab is inserted into the slot; and the exterior edge of at least one of the legs of the tab includes a tang, whereby when the blind rivet is upset, the expanding body portion of the blind rivet exerts a force against the interior edges of the legs of the tab and pushes the tang against one side of the slot in the base.

4. Apparatus for securing an object to a base, the base having an inner surface and an outer surface, wherein the object is to be secured to the inner surface of the base, the apparatus comprising:

a generally rectangular slot extending from the inner surface of the base into the base but not extending to the outer surface of the base, the slot including a generally cylindrical void having a predetermined diameter, the void being centered in the slot and extending from the outer surface of the base to the inner surface of the base;

a flat, generally rectangular tab mechanically attached to the object, the tab having first and second legs extending from the object which first and second legs define a generally U-shaped opening in the tab, each leg having an interior edge which includes a lateral groove and an exterior edge, wherein at least one leg of the tab includes a tang on the exterior edge and the interior edges of the legs are separated from one another by a predetermined distance; and a blind rivet having a head portion and a body portion, the head portion being generally circular in shape and having a diameter greater than the predetermined diameter, the body portion being generally cylindrical in shape and having a diameter less than the predetermined diameter;

wherein, the blind rivet is inserted through the void from the outer surface of the base and the tab is inserted into the slot from the inner surface of the base, and into the U-shaped opening in the tab whereby when the blind rivet is mechanically upset, the body portion of the blind rivet expands into the lateral groove in the tab pulling the object toward the base and pushing the tang into one side of the slot.

5. Apparatus for securing a mechanical frame to a base of a circuit breaker, the base having an inner surface and an outer surface, wherein the mechanical frame is to be secured to the inner surface of the base, the apparatus comprising:

a generally rectangular slot extending from the inner surface of the base into the base but not extending to the outer surface of the base, the slot including a generally cylindrical void having a predetermined diameter, the void being centered in the slot and extending from the outer surface of the base to the inner surface of the base;

a flat, generally rectangular tab mechanically attached to the mechanical frame, the tab having first and second legs extending from the mechanical frame which first and second legs define a generally U-shaped opening in the tab, each leg having an interior edge which includes a lateral groove and an exterior edge, wherein at least one leg of the tab includes a tang on the exterior edge and wherein the interior edges of the legs are separated from one another by a predetermined distance; and a blind rivet having a head portion and a body portion, the head portion being generally circular in shape and having a diameter greater than the predetermined diameter, the body portion being generally cylindrical in shape and having a diameter less than the predetermined diameter;

wherein, the blind rivet is inserted through the void from the outer surface of the base and the tab is inserted into the slot from the inner surface of the base, and into the U-shaped opening in the tab whereby when the blind rivet is mechanically upset, the body portion of the blind rivet expands into the lateral groove in the tab pulling the mechanical frame toward the base and pushing the tang into at least one side of the slot.

* * * * *